(12) United States Patent
Kolhouse et al.

(10) Patent No.: US 10,815,919 B2
(45) Date of Patent: Oct. 27, 2020

(54) ENGINE CONTROL BASED ON COMBUSTION MISFIRE OF EXHAUST GAS RECIRCULATION CYLINDER

(71) Applicant: Cummins Inc., Columbus, IN (US)

(72) Inventors: J. Steven Kolhouse, Columbus, IN (US); David J. Stroh, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/144,704

(22) Filed: Sep. 27, 2018

(65) Prior Publication Data
US 2020/0102900 A1    Apr. 2, 2020

(51) Int. Cl.
*F02D 35/02* (2006.01)
*F02D 41/00* (2006.01)
*F02M 26/47* (2016.01)

(52) U.S. Cl.
CPC ....... *F02D 41/0052* (2013.01); *F02D 35/021* (2013.01); *F02D 35/023* (2013.01); *F02D 35/027* (2013.01); *F02M 26/47* (2016.02); *F02D 2200/1015* (2013.01)

(58) Field of Classification Search
CPC .. F02D 41/0052; F02D 35/021; F02D 35/023; F02D 35/027; F02D 2200/1015; F02M 26/47
USPC .... 123/435, 406.14, 406.27, 406.48, 568.21; 701/111, 108; 73/114.02, 114.03, 114.04
See application file for complete search history.

(56) References Cited

U.S. PATENT DOCUMENTS

| | | | | |
|---|---|---|---|---|
| 6,560,526 B1 * | 5/2003 | Matekunas | ......... | F02D 41/1498 123/435 |
| 7,234,446 B2 * | 6/2007 | Toyoda | .................. | G01M 15/11 123/406.14 |
| 7,257,482 B2 * | 8/2007 | Yasui | .................... | G01M 15/08 123/406.21 |
| 7,707,874 B2 * | 5/2010 | Suzuki | ................... | G01M 15/11 73/114.04 |
| 8,061,189 B2 * | 11/2011 | Bachmaier | .............. | F02P 17/12 73/114.02 |
| 9,261,433 B2 * | 2/2016 | Ito | .......................... | G01M 15/11 |
| 9,556,810 B2 | 1/2017 | Bizub | | |
| 9,587,617 B2 * | 3/2017 | Stroh | .................... | F02P 5/1516 |
| 9,845,754 B2 * | 12/2017 | Lana | ................... | F02D 41/1439 |
| 9,856,829 B2 * | 1/2018 | Leone | ................... | B60K 6/365 |
| 9,857,273 B2 * | 1/2018 | Hozumi | ................. | G01M 15/11 |
| 9,925,974 B2 * | 3/2018 | Leone | ................... | B60W 10/06 |
| 10,060,382 B2 * | 8/2018 | Glugla | ................ | F02D 41/0062 |
| 10,273,929 B2 * | 4/2019 | Takei | ................... | F02P 5/1506 |
| 2015/0176513 A1 | 6/2015 | Lana et al. | | |
| 2017/0218863 A1 * | 8/2017 | Geckler | .............. | F02D 41/0057 |
| 2019/0162158 A1 * | 5/2019 | Zurlo | ................... | F02P 5/1526 |
| 2019/0178188 A1 * | 6/2019 | Glugla | ................ | F02D 41/1495 |

* cited by examiner

*Primary Examiner* — Hai H Huynh
(74) *Attorney, Agent, or Firm* — Foley & Lardner LLP

(57) ABSTRACT

A system for controlling combustion misfire in an engine comprising a plurality of cylinders, at least a portion of the plurality of cylinders receiving recirculated exhaust gas, comprises a controller structured to detect a combustion misfire in at least one of the cylinders of the plurality of cylinders. The controller is configured to retard a spark timing of at least the portion of the plurality of cylinders after a time delay.

22 Claims, 4 Drawing Sheets

ENGINE CONTROL BASED ON COMBUSTION MISFIRE OF EXHAUST GAS RECIRCULATION CYLINDER

TECHNICAL FIELD

The present disclosure relates generally to the field of engine control and more particularly, to engine control based on combustion misfire of a dedicated exhaust gas recirculation (EGR) cylinder.

BACKGROUND

EGR includes recirculating a portion of exhaust gas generated by the firing of cylinders of an internal combustion (IC) engine back to the cylinders for subsequent cylinder firings. One or more dedicated EGR cylinders, sometimes referred to as donor cylinders, typically provide the recirculated exhaust gas from an exhaust manifold to an intake manifold of the engine. When one of the dedicated EGR cylinders misfires, the exhaust charge can contain increased levels of unburnt fuel, and result in suboptimal (i.e., low) exhaust gas levels being recirculated back to the intake manifold. When the suboptimal exhaust gas levels reach the intake manifold, engine cylinders ingest a charge that contains increased fuel charge and lower recirculated exhaust gas levels, which results in a higher propensity for engine knock.

SUMMARY

Embodiments described herein relate generally to systems and methods for reducing impact of combustion misfire on an operation of an engine that includes a plurality of cylinders configured to receive recirculated exhaust gas and the combustion misfire occurs in at least one of the plurality of cylinders (e.g., a dedicated EGR cylinder) thereof. In particular, systems and methods described herein are configured to retard spark timing of one or more cylinders of the engine in response to detecting combustion misfire in at least one of the cylinders (e.g., the dedicated EGR cylinder) after a time delay.

In some embodiments, a system for controlling combustion misfire in an engine that comprises a plurality of cylinders, at least a portion of the plurality of cylinders receiving recirculated exhaust gas, comprises a controller structured to detect a combustion misfire in at least one of the plurality of cylinders. The controller is further configured to retard a spark timing of at least the portion of the plurality of cylinders after a time delay.

In some embodiments, a system for controlling combustion misfire in an engine that comprises a plurality of cylinders, at least one of the plurality of cylinders being a dedicated EGR cylinder, comprises a controller structured to detect a combustion misfire in the dedicated EGR cylinder. The controller is configured to determine a degree of the combustion misfire in the dedicated EGR cylinder and after a time delay, retard a spark timing of each of the plurality of cylinders by an amount based on the degree of combustion misfire.

In some embodiments, a method for combustion misfire control in an engine comprising a plurality of cylinders, at least a portion of the plurality of cylinders receiving recirculated exhaust gas, comprises detecting a combustion misfire in at least one of the plurality of cylinders. A spark timing of at least the portion of the plurality of cylinders is retarded after a time delay.

In some embodiments, a system for controlling combustion misfire in an engine comprising a plurality of cylinders, at least one of the plurality of cylinders being a dedicated exhaust gas recirculation (EGR) cylinder, comprises a controller structured to detect a combustion misfire in the dedicated EGR cylinder. The controller is configured to implement spark retardation in the dedicated EGR cylinder immediately upon detecting the combustion misfire. The controller is also configured to retard a spark timing of one or more of the plurality of cylinders after a time delay by an amount based on the degree of combustion misfire.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
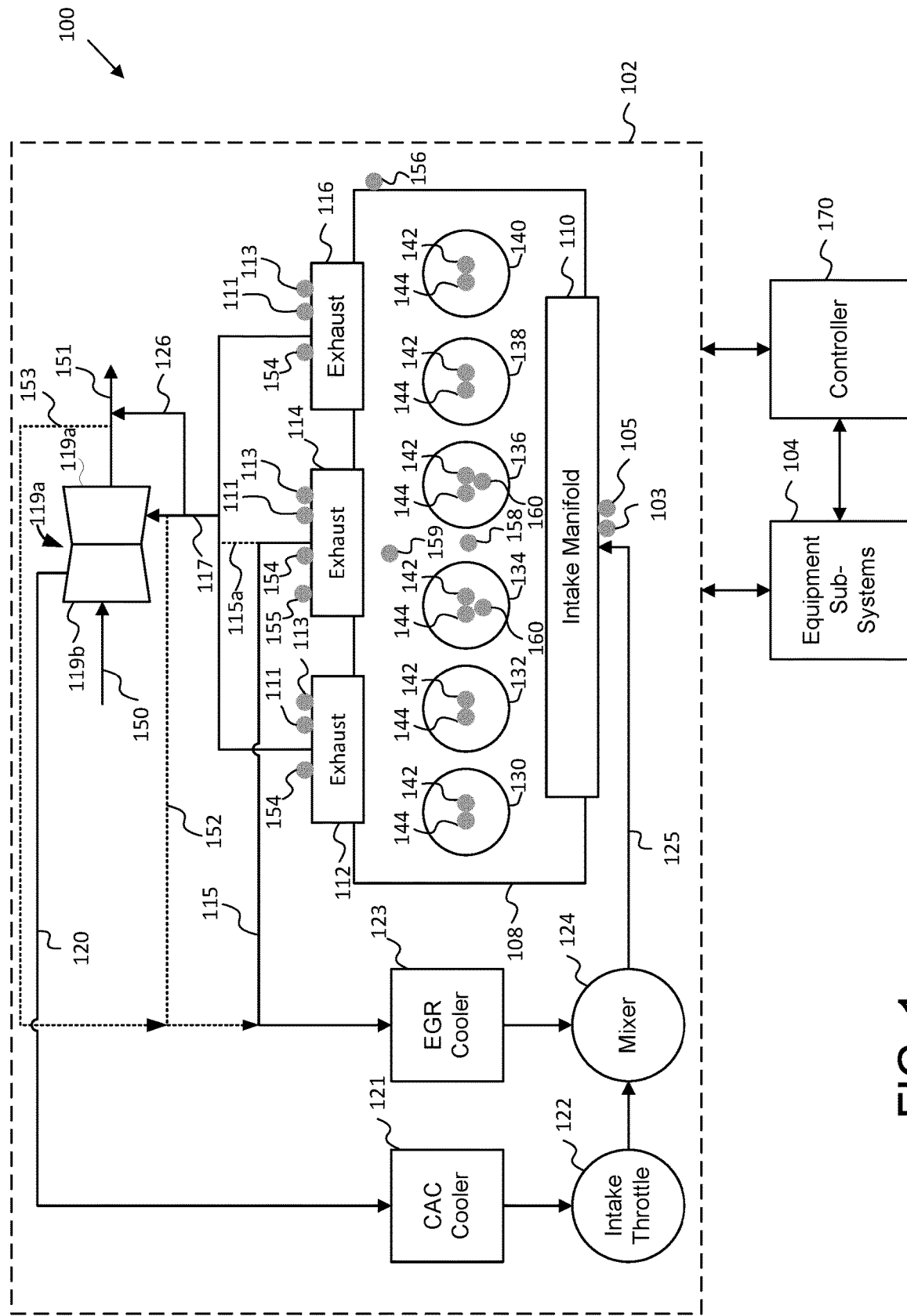
FIG. 1 is a schematic illustration of a system that includes an engine having a plurality of cylinders and a controller, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for reducing impact of combustion misfire on an operation of an engine that includes a plurality of cylinders configured to receive recirculated exhaust gas and the combustion misfire occurs in at least one of the plurality of cylinders (e.g., a dedicated EGR cylinder) thereof. In particular, systems and methods described herein are configured to retard spark timing of one or more cylinders of the engine in response to detecting combustion misfire in at least one of the cylinders (e.g., the dedicated EGR cylinder) after a time delay.

Various embodiments of the systems and methods described herein for engine control based on combustion misfire provide benefits including, for example: (1) retarding a spark timing in response to detecting a combustion misfire in a cylinder of the engine such as a dedicated EGR cylinder of the engine after a time delay, thereby allowing the improperly combusted recirculated exhaust gas to reach the other cylinders of the engine before initiating spark timing retardation; (2) reducing engine knock; and (3) increasing combustion efficiency and fuel economy of the engine.

FIG. 1 is a schematic illustration of an EGR system 100 including a controller 170, according to an embodiment. The EGR system 100 comprises an EGR subsystem 102 and equipment subsystems 104. The EGR subsystem 102 includes a cylinder block 108 associated with an engine (e.g., a diesel, a gasoline, a natural gas, an ethanol, a dual-fuel, a biodiesel, a dual fuel engine or any other suitable internal combustion engine). The EGR subsystem 102 also includes an intake manifold 110, exhaust manifolds 112, 114 and 116, a turbocharger 119, a waste gate 126, an EGR cooler 123, a charge-air cooler (CAC) 121, an intake throttle 122, and a mixer 124.

The cylinder block 108 includes a plurality of cylinders 130, 132, 134, 136, 138 and 140 configured to receive air-exhaust gas mixture and compress the air-exhaust gas mixture (e.g., via a reciprocating piston) to a suitable compression ratio for optimal combustion. It should be appreciated that while FIG. 1 shows a particular embodiment of a cylinder block 108 including six cylinders, any other cylinder block including any number of cylinders, for example 4, 8, 10, 12 or even more may be included in the EGR system 100.

A fuel injector 142 and a spark plug 144 are coupled to each of the cylinders 130, 132, 134, 136, 138, and 140. In some embodiments, at least one of the cylinders (e.g., the cylinders 134 and 136) may also include an ion sensor 160 configured to measure a combustion efficiency of the corresponding cylinder. In other embodiments, the spark plug 144 provided in one or more of the plurality of cylinders 130, 132, 134, 136, 138, and 140 may be configured to also function as an ion sensor for sensing combustion efficiency of the corresponding cylinder. In some embodiments, a knock sensor 158 (e.g., a vibration type or acoustic type knock sensor) may be coupled to one or more cylinders of the cylinder block 108 and configured to determine a knock in one or more of the cylinders. In particular embodiments, the knock sensor 158 determine knock based on the vibration of the corresponding cylinder (e.g., the cylinder 130, 132, 134, 136, 138 and/or 140). In some embodiments, a vibration sensor 159 may also be coupled to the cylinder block 108 and configured to measure an amount of vibration in the cylinder block 108 or in a corresponding cylinder. The amount of vibration may correspond to an amount of knock in the cylinders of the cylinder block 108. Furthermore, a torque sensor 156 may be operatively coupled to the cylinder block 108, for example, a crank shaft (not shown) associated with the cylinder block 108 and configured to sense a torque generated by each of the plurality of cylinders 130, 132, 134, 136, 138 and 140.

The intake manifold 110 is coupled to the cylinder block 108 and a mixer 124 configured to mix intake air with recirculated exhaust gas via an intake line 125. The intake manifold 110 is configured to receive intake air from an intake throttle 122 which is mixed downstream with recirculated exhaust gas in the mixer 124, and communicates intake air-exhaust gas mixture to each of the plurality of cylinders 130, 132, 134, 136, 138, and 140. An intake temperature sensor 103 and an intake pressure sensor 105 may be coupled to the intake manifold 110 and configured to determine a temperature and pressure of the intake air-exhaust gas mixture, respectively.

Exhaust manifolds 112, 114, 116 include a first exhaust manifold 112 coupled to the cylinders 130, 132, a second exhaust manifold 114 coupled to the cylinders 134, 136, and a third exhaust manifold 116 coupled to the cylinders 138, and 140, each exhaust manifold 112, 114, 116 configured to receive exhaust gas from the corresponding cylinders. An exhaust manifold temperature (EMT) sensor 111 and an exhaust manifold pressure (EMP) sensor 113 may be coupled to each of the exhaust manifolds 112, 114 and 116, and configured to measure a temperature of the exhaust gas expelled from the corresponding cylinder.

In some embodiments, an oxygen sensor 154 may also be coupled to each of the first, second and third exhaust manifolds 112, 114, and 116 and configured to measure an amount of oxygen in the exhaust gas flowing through the respective exhaust manifolds 112, 114, and 116.

In some embodiments, a NOx sensor 155 may also be operably coupled to the second exhaust manifold 114 or an exhaust line 117 configured to receive the exhaust flow from the first and third exhaust manifolds 112 and 116. The NOx sensor 155 may be configured to measure an amount of NOx gases flowing through the second exhaust manifold 114 and, optionally the exhaust line 117.

Although a specific number and type of sensors are shown in FIG. 1 coupled with particular components of the EGR system 100, it will be appreciated that the number, type, and location of the sensors included in the EGR system 100 can vary. In some embodiments, the sensors can comprise virtual sensors (e.g. virtual torque sensors, virtual nitric oxide (NOx) sensors, etc.) structured to monitor operating parameters of the EGR system 100.

In some embodiments, at least one of the plurality of cylinders 130, 132, 134, 136, 138, and 140 may include a dedicated EGR cylinder. For example, as shown in FIG. 1, the system 100 may include dedicated EGR cylinders 134 and 136. In such embodiments, the second exhaust manifold 114 corresponding to the dedicated EGR cylinders 134 and 136 is fluidly coupled to the intake line 125 via an EGR cooler 123 and the mixer 124. This allows intake air mixed with the recirculated exhaust gas to be recirculated from the dedicated EGR cylinders 134 and 136 to the intake manifold 110 and therefrom, to each of the plurality of cylinders 130, 132, 134, 136, 138, and 140. An EGR line 115 couples the second intake manifold 114 to the EGR cooler 123. The EGR cooler 123 may include an air cooled, a water cooled or a coolant cooled radiator configured to cool the recirculated exhaust gas to a predetermined temperature. The mixer 124 may include a venturi or diffuser configured to facilitate mixing of the exhaust gas with the intake air.

A turbocharger 119 is positioned downstream of the exhaust manifolds 112 and 116 and is configured to receive exhaust gas from the first exhaust manifold 112 and the third exhaust manifold 116 via the exhaust line 117. The turbocharger comprises a turbine 119a and a compressor 119b. The exhaust gas drives the turbine 119a, and is then communicated into a downstream component, for example, an aftertreatment system (not shown) via the exhaust outlet 151. The compressor 119*b* is coupled to the turbine 119*a* (e.g., mounted on the same shaft) and configured to be driven by the turbine 119*a*. The compressor 119*b* receives charge or intake air via an air inlet line 150 and compresses the intake air so as to pressurize the intake air. The pressurized intake air is communicated via the turbocharger line 120 to the intake throttle 122 via the CAC cooler 121 which is configured to cool the intake air before it is communicated to the cylinder block 108. The waste gate 126 is configured to divert a portion of the exhaust gas flow greater than a threshold exhaust gas flow from the exhaust line 117 to the exhaust outlet 151 so as to bypass the turbocharger 119. This allows the waste gate 126 to regulate an amount of exhaust gas provided to the turbocharger 119 so as to control a rotational speed of the turbine 119*a*. In this manner, a rotational speed of the compressor 119*b* which allows control of pressurization of the intake air.

While FIG. 1 shows the cylinder block 108 including dedicated EGR cylinders 134 and 136, in other embodiments, the EGR system 100 may not include a dedicated EGR cylinder. For example, in some embodiments, the second exhaust manifold 114 may also be coupled to the exhaust line 117 via a second exhaust manifold line 115*a* such that the exhaust line 117 receives exhaust gas from each of the plurality of cylinders 130, 132, 134, 136, 138 and 140. An upstream exhaust return line 152 may be fluidly coupled to the exhaust line 117 and the EGR cooler 123 and configured to recirculate a portion of high pressure exhaust gas from downstream of the exhaust manifolds 112, 114 and 116 and upstream of the turbocharger 119 to the EGR cooler 123. In other embodiments, a downstream exhaust return line 153 may be fluidly coupled to the exhaust outlet 151 and to the EGR cooler 123 and configured to recirculate a portion of low pressure exhaust gas from downstream of the turbocharger 119 to the EGR cooler 123. In still other embodiments, the EGR cooler 123 may include each of the high pressure and low pressure EGR.

The equipment subsystems 104 includes various systems or subsystems configured to receive or transmit information to one of more components of the EGR system 100 and or components associated with the cylinder block 108, for example, to facilitate control of operation thereof. In various embodiments, the equipment subsystems 104 may include, for example, a spark ignition system configured to provide ignition signals to each of the spark plugs 144 based on a predetermined spark timing determined by the controller 170. In some embodiments, the equipment subsystems 104 may include a fuel injection system configured to control an amount of fuel inserted into the cylinders 130, 132, 134, 136, 138, 140 based on an insertion command provided by the controller 170. In some embodiments, the equipment subsystems 104 may also include an intake throttle control system configured to adjust a degree of opening of the intake throttle 122 based on commands from the controller 170, for example, to control an amount of air inserted into the plurality of cylinders 130, 132, 134, 136, 138, 140.

Components of the EGR system 100 may communicate with each other or external components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 170 is communicably coupled to the equipment subsystems 104 and components in the EGR system 100 of FIG. 1, the controller 170 is structured to receive data regarding one or more of the components shown in FIG. 1. For example, the data may include operation data corresponding to the combustion misfire, for example, temperature, pressure, torque, combustion efficiency, oxygen or NOx concentration, knock data or vibration data received from one or more of the sensors described herein. The controller 170 may use the information to control operation of the engine based on the combustion misfire.

As previously described herein, various systems of the EGR system 100 can be controlled to reduce the negative impact of combustion misfire occurring in one of the plurality of cylinders 130, 132, 134, 136, 138, 140 or in particular embodiments, combustion misfire occurring in a dedicated EGR cylinder (e.g., occurring in at least one of the dedicated EGR cylinders 134 and 136). In some embodiments, the controller 170 may include a central controller of an equipment including the EGR system 100 (e.g., a vehicle or power gen system). In other embodiments, the controller 170 may include a controller of the EGR system 100, which may be communicatively coupled to a central controller of the equipment.

In some embodiments, the controller 170 may be configured to detect a combustion misfire in at least one of the plurality of cylinders 130, 132, 134, 136, 138 or 140. For example, in some embodiments, the EGR system 100 may include a high or low pressure EGR system in which a portion of the total exhaust gas upstream or downstream of the turbocharger 119, respectively is recirculated with the intake air into the cylinders 130, 132, 134, 136, 138 or 140. In other embodiments, at least one of the plurality of cylinders (e.g. the cylinders 134 and 136) may include a dedicated EGR cylinder instead of the high or low pressure EGR, as previously described herein. For example, the cylinder block 108 may include the dedicated EGR cylinders 134, 136. In such embodiments, the combustion misfire may be in at least one of the dedicated EGR cylinders 134 and 136, and the controller 170 may be configured to detect a combustion misfire in the dedicated EGR cylinders 134, 136.

The controller 170 may be configured to detect the combustion misfire using any suitable means. For example, in some embodiments, the controller 170 may be configured to detect the combustion misfire that occurs in at least one of the dedicated EGR cylinder 134 or 136 based on at least one of an exhaust manifold pressure, an exhaust manifold temperature, a dedicated EGR cylinder pressure, an ionic current in the dedicated EGR cylinder 134, 136, an amount of oxygen in recirculated exhaust gas, an amount of NOx in recirculated exhaust gas, an amount of vibration of the dedicated EGR cylinder 134, 136 or an engine torque of the engine. One or more of these parameters may also be used to detect combustion misfire in the other non-EGR cylinders 130, 132, 138 and 140.

The controller 170 is configured to retard a spark timing of at least a portion of the plurality of cylinders after a time delay. For example, in some embodiments, in which the EGR system 100 includes a high or low pressure EGR system, the controller 170 may be configured to retard the spark timing of each of the plurality of cylinders 130, 132, 134, 136, 138 and 140 after the time delay. In other embodiments, in which the EGR system 100 comprises the dedicated EGR cylinders 134 and 136, the controller 170 may be configured to retard the spark timing of the dedicated EGR cylinders 134 and 136 by a first amount immediately after detecting the combustion misfire. Furthermore, the controller 170 may be configure to retard the spark timing of the other non-EGR cylinders 130, 132, 138 and 140 by a second amount after the time delay.

Expanding further, combustion misfire causes exhaust to be emitted from the cylinders which has high amount of unburnt hydrocarbons. Retarding the spark timing can be defined as changing the timing of activating the spark plug so that fuel ignition happens later in the corresponding cylinder relative to the time that it happens under normal operating conditions. For example, spark ignition timing may be specified as 12 degrees Before Top Dead Center (BTDC) during normal operation, and may be retarded to 11 degrees BTDC based on combustion misfire. Retarding the spark timing allows to account for lower quality exhaust gas being recirculated to the cylinders 130, 132, 134, 136, 138, 140 due to the combustion misfire.

The controller 170 is configured to retard the spark timing of the dedicated EGR cylinders 134 and 136 by the first amount immediately after detecting the combustion misfire so as to reduce a negative impact of the combustion fire in the dedicated EGR cylinders 134 and 136 (e.g., reduce knock). However, the lower quality exhaust gas produced due to the combustion fire in the dedicated EGR cylinders 134 and 136 takes time to be recirculated back to the other non-EGR cylinders 130, 132, 138 and 140. The controller 170 retards the spark timing of the other non-EGR cylinders 130, 132, 138 and 140 after the time delay to allow sufficient time for the recirculated exhaust gas to reach the other non-EGR cylinders 130, 132, 138 and 140. In some embodiments, the time delay may be one of a pre-determined fixed time delay, a variable time delay based on an engine speed, or a variable time delay based on crank angle revolutions of the crankshaft of the engine including the cylinder block 108. In particular embodiments, the time delay may be in a range of 0.1-2.0 seconds.

In some embodiments, the first amount of retarding the spark timing in the dedicated EGR cylinders 134, 136 and the second amount of retarding the spark timing in the other non-EGR cylinders 130, 132, 138, 140 is based on an engine operating condition, for example, an engine speed, an engine torque, lean, rich or stoichiometric operating condition, an engine temperature, intake air pressure or any other suitable engine operating condition.

In some embodiments, the first amount of retarding the spark timing in the dedicated EGR cylinders 134 and 136, and the second amount of retarding the spark timing in the other non-EGR cylinders 130, 132, 138 and 140 is based on a degree of combustion misfire in the dedicated EGR cylinders 134 and 136. For example, the controller 170 may be configured to determine a degree of combustion misfire in the dedicated EGR cylinders 134 and 136. The controller 170 may determine that the degree of combustion misfire comprises a light combustion misfire which may correspond to an exhaust manifold pressure of the recirculated exhaust gas in the second exhaust manifold 114 (e.g., determined by the EMP sensor 113) being above a first threshold corresponding to light combustion misfire but below a second threshold corresponding to moderate combustion misfire. Light combustion misfire is the least of severe of combustion misfires and results in exhaust gas being produced by the corresponding cylinder having emissions levels that are sufficiently high to fail an emission test. In such embodiments, the second amount of sparking timing retard of the other non-EGR cylinders 130, 132, 138 and 140 may be the same as the first amount of spark timing retard of the dedicated EGR cylinders 134 and 136. In particular embodiments, the spark timing of the other non-EGR cylinders 130, 132, 138 and 140 may not be retarded in response to the controller 170 detecting a light combustion misfire.

In other embodiments, the degree of combustion misfire may include moderate combustion misfire. Moderate combustion misfire is more severe than light combustion misfire and results in exhaust gas being produced by the corresponding cylinder that increases harmful emissions to greater than 1.5 times the Federal Test Procedure (FTP) standards. For example, the controller 170 may determine that the exhaust manifold pressure (e.g., determined by the EMP sensor 113) is above the second threshold. In such embodiments, the second amount of spark timing retard of the non-EGR cylinders 130, 132, 138 and 140 is different from the first amount of spark timing retard of the dedicated EGR cylinders 134 and 136 (e.g., the second amount is greater than the first amount).

In particular embodiments, the controller 170 may be configured to retard the spark timing of each of the plurality of cylinders 130, 132, 134, 136, 138 and 140 after the time delay in response to detecting a light combustion misfire. Furthermore, the controller 170 may be configured to retard the spark timing of each of the plurality of cylinders 130, 132, 134, 136, 138 and 140 after the time delay in response to detecting a moderate combustion misfire. In such embodiments, the controller 170 may also be configured to restrict an intake air flow into each of the cylinders after the time delay. The controller 170 may also be configured to subsequently, reduce an amount of fuel inserted into each of the plurality of cylinders 130, 132, 134, 136, 138 and 140 to maintain a stoichiometric air-fuel ratio in each of the plurality of cylinders 130, 132, 134, 136, 138 and 140.

Figure 2:
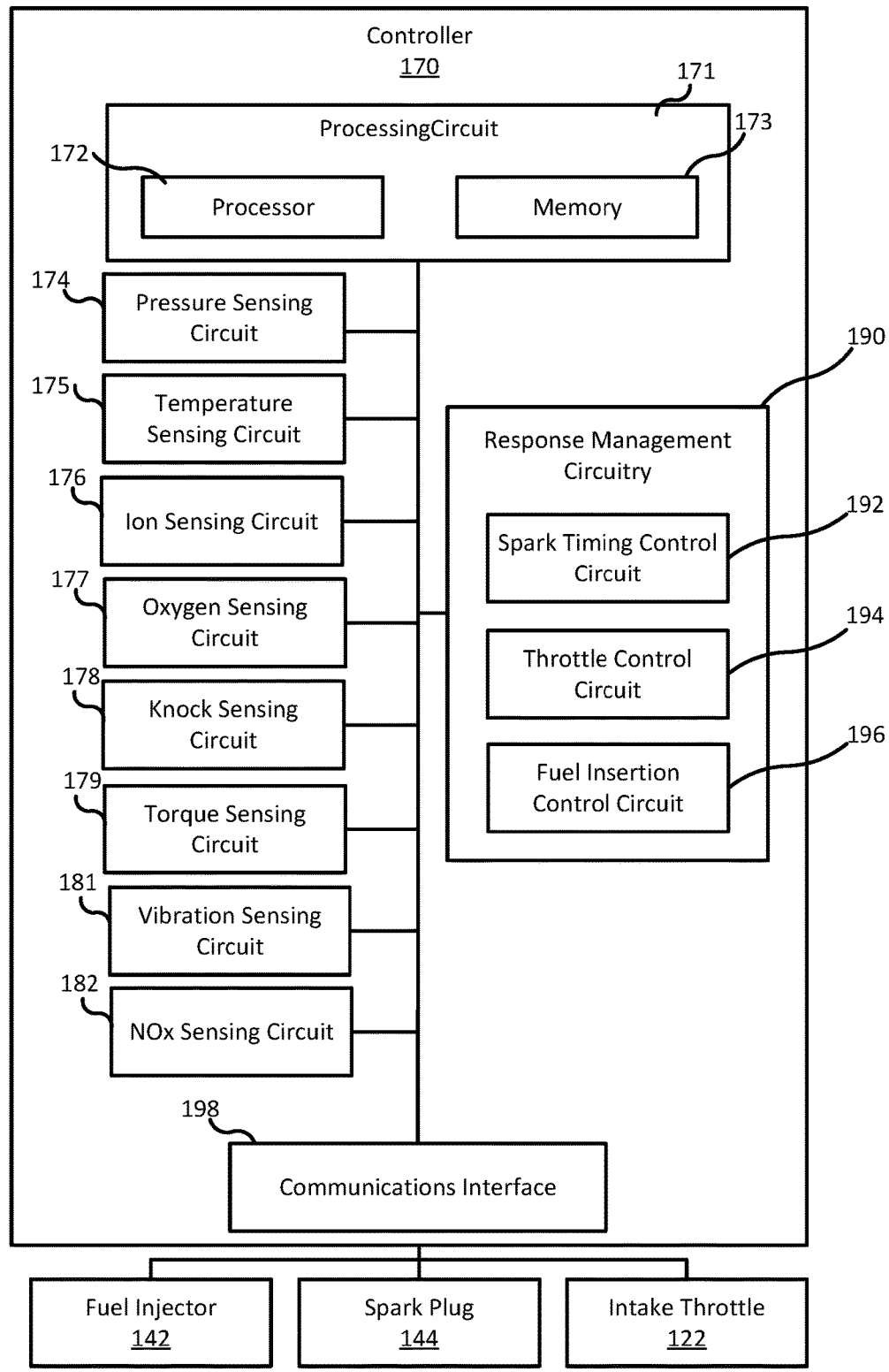
FIG. 2 is a schematic block diagram of a controller which may be used in the systems of FIG. 1, according to an embodiment.

In various embodiments, the controller 170 may comprise an electronic control unit configured to receive various signals, for example, a pressure signal from the EMP sensors 113, a temperature signal from the EMT sensors 111, an ion sensor signal from the ion sensors 160 or the spark plugs 144, an oxygen sensor signal from the oxygen sensor 154, a NOx sensor signal from the NOx sensor 155, a torque sensor signal from the torque sensor 156 and/or a vibration or noise signal from the vibration sensor 159 to determine a combustion misfire in the dedicated EGR cylinders 134 and 136 or in any one of the cylinders 130, 132, 134, 136, 138 and 140 (e.g., in implementations in which the EGR system 100 does not include a dedicated EGR cylinder) and control the impact of combustion misfire accordingly. As shown in FIG. 2, the controller 170 includes a processing circuit 171 having a processor 172 and a memory 173, a pressure sensing circuit 174, a temperature sensing circuit 175, an ion sensing circuit 176, an oxygen sensing circuit 177, a knock sensing circuit 178, a torque sensing circuit 179, a vibration sensing circuit 181 and/or a NOx sensing circuit 182. The controller 170 may also include a response management circuitry 190 including a spark timing control circuit 192, a throttle control circuit 194 and a fuel insertion control circuit 196. Furthermore, the controller 170 may include a communications interface 198.

The processor 172 may comprise a microprocessor, programmable logic controller (PLC) chip, an ASIC chip, or any other suitable processor. The processor 172 is in communication with the memory 173 and configured to execute instructions, algorithms, commands, or otherwise programs stored in the memory 173. The memory 173 may comprise any of the memory and/or storage components discussed herein. For example, memory 173 may comprise a RAM and/or cache of processor 172. The memory 173 may also comprise one or more storage devices (e.g., hard drives, flash drives, computer readable media, etc.) either local or remote to the controller 170. The memory 173 is configured to store look up tables, algorithms, or instructions.

In one configuration, the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 are embodied as machine or computer-readable media (e.g., stored in the memory 173) that is executable by a processor, such as the processor 172. As described herein and amongst other uses, the machine-readable media (e.g., the memory 173) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 are embodied as hardware units, such as electronic control units. As such, the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 may be embodied as one or more circuitry components including, but not limited to, processing circuitry, network interfaces, peripheral devices, input devices, output devices, sensors, etc. In some embodiments, the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 may also include programmable hardware devices such as field programmable gate arrays, programmable array logic, programmable logic devices or the like. In this regard, the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 may include one or more memory devices for storing instructions that are executable by the processor(s) the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190. The one or more memory devices and processor(s) may have the same definition as provided below with respect to the memory 173 and the processor 172.

In the example shown, the controller 170 includes the processing circuit 171 having the processor 172 and the memory 173. The processing circuit 171 may be structured or configured to execute or implement the instructions, commands, and/or control processes described herein with respect to the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190. Thus, the depicted configuration represents the aforementioned arrangement where the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182, and the response management circuitry 190 are embodied as machine or computer-readable media. However, as mentioned above, this illustration is not meant to be limiting as the present disclosure contemplates other embodiments such as the aforementioned embodiment where the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182 and the response management circuitry 190 are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the pressure sensing circuit 174, the temperature sensing circuit 175, the ion sensing circuit 176, the oxygen sensing circuit 177, the knock sensing circuit 178, the torque sensing circuit 179, the vibration sensing circuit 181, the NOx sensing circuit 182 and the response management circuitry 190 may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 173 (e.g., RAM, ROM, Flash Memory, hard disk storage, etc.) may store data and/or computer code for facilitating the various processes described herein. The memory 173 may be communicably connected to the processor 172 to provide computer code or instructions to the processor 172 for executing at least some of the processes described herein. Moreover, the memory 173 may be or include tangible, non-transient volatile memory or non-volatile memory. Accordingly, the memory 173 may include database components, object code components, script components, or any other type of information structure for supporting the various activities and information structures described herein.

The communications interface 198 may include wireless interfaces (e.g., jacks, antennas, transmitters, receivers, transceivers, wire terminals, etc.) for conducting data communications with various systems, devices, or networks. For example, the communications interface 198 may include an communication circuits for communication with each the various sensors included in the EGR system 100 and the equipment subsystems 104 via, for example, a CAN bus.

The pressure sensing circuit 174 is configured to interpret a pressure signal received from the EMP sensor 113 so as to determine an exhaust manifold pressure of the exhaust gas flowing through the second exhaust manifold 114, which receives exhaust gas from the dedicated EGR cylinders 134 and 136, or in other embodiments, from each of the exhaust manifolds 112, 114, 116. The pressure sensing circuit 174 may be configured to determine a combustion misfire in at least one of the dedicated EGR cylinder 134 or 136 (or in other implementations, in any one of the cylinders 130, 132, 134, 136, 138, 140) based on the exhaust manifold pressure. For example, the pressure sensing circuit 174 may determine a light combustion misfire in at least one of the dedicated EGR cylinder 134 or 136 (or in other implementations, in any one of the cylinders 130, 132, 134, 136, 138, 140) in response to the exhaust manifold pressure being greater than a first threshold but less than a second threshold, or determine a moderate combustion misfire in response to the exhaust manifold pressure being greater than the second threshold.

The temperature sensing circuit 175 is configured to interpret a temperature signal received from the EMT sensors 111 so as to determine an exhaust manifold temperature of the exhaust gas flowing through the second exhaust manifold 114, or in other embodiments, from each of the exhaust manifolds 112, 114, 116. The temperature sensing circuit 175 may be configured to determine a combustion misfire in at least one of the dedicated EGR cylinder 134 or 136 (or in other implementations, in any one of the cylinders 130, 132, 134, 136, 138, 140) based on the exhaust manifold temperature. For example, the pressure sensing circuit 174 may determine a combustion misfire in at least one of the dedicated EGR cylinder 134 or 136 (or in other implementations, in any one of the cylinders 130, 132, 134, 136, 138, 140) in response to the exhaust manifold temperature being less than a temperature threshold, for example, due to incomplete combustion of air/fuel mixture in the corresponding dedicated EGR cylinder 134 and/or 136.

The ion sensing circuit 176 is configured to interpret an ion sensor signal received from the ion sensors 160 or the spark plugs 144 so as to determine a combustion efficiency of the dedicated EGR cylinders 134 and 136, or in other embodiments, a combustion efficiency of each of the cylinders 130, 132, 134, 136, 138 or 140. The ion sensing circuit 176 may be configured to determine a combustion misfire in at least one of the dedicated EGR cylinder 134 or 136 (or in other implementations, in any one of the cylinders 130, 132, 134, 136, 138, 140) based on the combustion efficiency. For example, the ion sensing circuit 176 may determine a combustion misfire in at least one of the dedicated EGR cylinder 134 or 136 (or in other implementations, in any one of the cylinders 130, 132, 134, 136, 138, 140) in response to the combustion efficiency being less than a combustion efficiency threshold, the combustion efficiency threshold corresponding to combustion of substantially all of the hydrocarbons in the air/fuel mixture provided to the dedicated EGR cylinders 134 and 136.

The oxygen sensing circuit 177 is configured to interpret an oxygen sensor signal received from the oxygen sensor 154 so as to determine an amount of oxygen in the exhaust gas flowing through the second exhaust manifold 114, or in other embodiments, from each of the exhaust manifolds 112, 114, 116. The oxygen sensing circuit 177 may be configured to determine a combustion misfire in at least one of the dedicated EGR cylinder 134 or 136 (or in other implementations, in any one of the cylinders 130, 132, 134, 136, 138, 140) based on the amount of oxygen in the exhaust gas. For example, the oxygen sensing circuit 177 may determine a combustion misfire in at least one of the dedicated EGR cylinder 134 or 136 (or in other implementations, in any one of the cylinders 130, 132, 134, 136, 138, 140) in response to the amount of oxygen in the exhaust being greater than an oxygen threshold corresponding to unused oxygen being present in the exhaust gas due to the combustion misfire.

The knock sensing circuit 178 is configured to interpret a knock sensor signal received from the knock sensor 158 so as to determine an amount of knock in the dedicated EGR cylinders 134 and 136, or in other embodiments, knock in each of the cylinders 130, 132, 134, 136, 138, 140. The knock sensing circuit 178 may be configured to determine a combustion misfire in at least one of the dedicated EGR cylinder 134 or 136 (or in other implementations, in any one of the cylinders 130, 132, 134, 136, 138, 140) based on the amount of knock. For example, the knock sensing circuit 178 may determine a combustion misfire in at least one of the dedicated EGR cylinder 134 or 136 (or in other implementations, in any one of the cylinders 130, 132, 134, 136, 138, 140) in response to the amount of knock in the corresponding dedicated EGR cylinder 134 and/or 136 (or in other implementations, in any one of the cylinders 130, 132, 134, 136, 138, 140) being greater than a knock threshold.

The torque sensing circuit 179 is configured to interpret a torque sensor signal received from the torque sensor 156 so as to determine an engine torque of the engine including cylinder block 108 corresponding to the dedicated EGR cylinders 134 and 136 (or in other implementations, in any one of the cylinders 130, 132, 134, 136, 138, 140). The torque sensing circuit 179 may be configured to determine a combustion misfire in at least one of the dedicated EGR cylinder 134 or 136 (or in other implementations, in any one of the cylinders 130, 132, 134, 136, 138, 140) based on the engine torque. For example, the torque sensing circuit 179 may determine a combustion misfire in at least one of the dedicated EGR cylinder 134 or 136 (or in other implementations, in any one of the cylinders 130, 132, 134, 136, 138, 140) in response to the amount of engine torque of the engine associated with the corresponding dedicated EGR cylinder 134 and/or 136 being less than a predetermined torque threshold.

The vibration sensing circuit 181 is configured to interpret a vibration sensor signal received from the vibration sensor 159 so as to determine an amount of vibration in the dedicated EGR cylinders 134 and 136, or in other embodiments, a vibration in each of the cylinders 130, 132, 134, 136, 138, 140 or the cylinder block 108. The vibration sensing circuit 181 may be configured to determine a combustion misfire in at least one of the dedicated EGR cylinder 134 or 136 (or in other implementations, in any one of the cylinders 130, 132, 134, 136, 138, 140) based on the amount of vibration. For example, the vibration sensing circuit 181 may determine a combustion misfire in at least one of the dedicated EGR cylinder 134 or 136 (or in other implementations, in any one of the cylinders 130, 132, 134, 136, 138, 140) in response to the amount of vibration in the corresponding dedicated EGR cylinders 134 and/or 136 (or in other implementations, in any one of the cylinders 130, 132, 134, 136, 138, 140) being greater than a vibration threshold.

The NOx sensing circuit 182 is configured to interpret a NOx sensor signal received from the NOx sensor 155 so as to determine an amount of NOx gases in the exhaust gas flowing through the second exhaust manifold 114, or in other embodiments, an amount of NOx gases in the exhaust gas emitted by each of the cylinders 130, 132, 134, 136, 138. The NOx sensing circuit 182 may be configured to determine a combustion misfire in at least one of the dedicated EGR cylinders 134 and 136 (or in other implementations, in any one of the cylinders 130, 132, 134, 136, 138, 140) based on the amount of NOx in the exhaust gas emitted from the corresponding dedicated EGR cylinder 134 or 136 (or in exhaust gas emitted by any other corresponding cylinder). For example, the NOx sensing circuit 182 may determine a combustion misfire in at least one of the dedicated EGR cylinders 134 and 136 (or in other implementations, in any one of the cylinders 130, 132, 134, 136, 138, 140) in response to the amount of NOx gases in the exhaust gas emitted by the corresponding dedicated EGR cylinder 134 and/or 136 (or in other implementations, in any one of the cylinders 130, 132, 134, 136, 138, 140) being less than a NOx threshold, due to incomplete combustion in the corresponding cylinder.

In various embodiments, any one of the temperature sensing circuit 175, the ion sensing circuit 176, the oxygen sensing circuit 177, the knock sensing circuit 178, the torque sensing circuit 179, the vibration sensing circuit 181 or the NOx sensing circuit 182 may also be configured to a degree of combustion misfire in the corresponding cylinder, as previously described herein with respect to the pressure sensing circuit 174.

The response management circuitry 190 is configured to control operations of the EGR system 100 based on combustion misfire. For example, in response to detecting a combustion misfire in at least one of the plurality of cylinders 130, 132, 134, 136, 138, 140, the spark timing control circuit 192 may be configured to retard a spark timing of at least one of the plurality of cylinders 130, 132, 134, 136, 138, 140 after a time delay, as previously described herein. In embodiments in which the EGR system 100 includes the dedicated EGR cylinders 134 and 136, the spark timing control circuit 192 may be configured to retard the spark timing of the dedicated EGR cylinders 134 and 136 by a first amount immediately upon detecting the combustion misfire, and retard the spark timing of the other non-EGR cylinders 130, 132, 138, 140 by a second amount after the time delay. The spark timing control circuit 192 may be configured to determine the first amount and the second amount based on the degree of combustion misfire as previously described herein.

In particular embodiments, the spark timing control circuit 192 may retard a spark timing of each of the plurality of cylinders 130, 132, 134, 136, 138, 140 after a time delay based on a degree of combustion misfire. For example, in response to a light combustion misfire in the dedicated EGR cylinders 134 and 136, the spark timing control circuit 192 retards a spark timing of each of the plurality of cylinders 130, 132, 134, 136, 138 and 140 after a time delay (e.g., a pre-determined fixed time delay, a variable time delay based on engine speed, or a variable time delay based on crank angle revolutions of a crankshaft of the engine).

In some embodiments, the sparking timing control circuit 192 may also be configured to retard a spark timing of each of the plurality of cylinders 130, 132, 134, 136, 138 and 140 after a time delay in response to moderate combustion misfire in at least one of the dedicated EGR cylinders 134, 136. In such embodiments, the throttle control circuit 194 may be configured to control the intake throttle 122 to restrict an intake air flow into each of the plurality of cylinders 130, 132, 134, 136, 138 and 140 after the time delay. Moreover, the fuel insertion control circuit 196 may be configured to subsequently reduce an amount of fuel inserted into each of the plurality of cylinders 130, 132, 134, 136, 138, 140, for example, to maintain a stoichiometric air-fuel ratio in each of the plurality of cylinders 130, 132, 134, 136, 138, 140.

Figure 3:
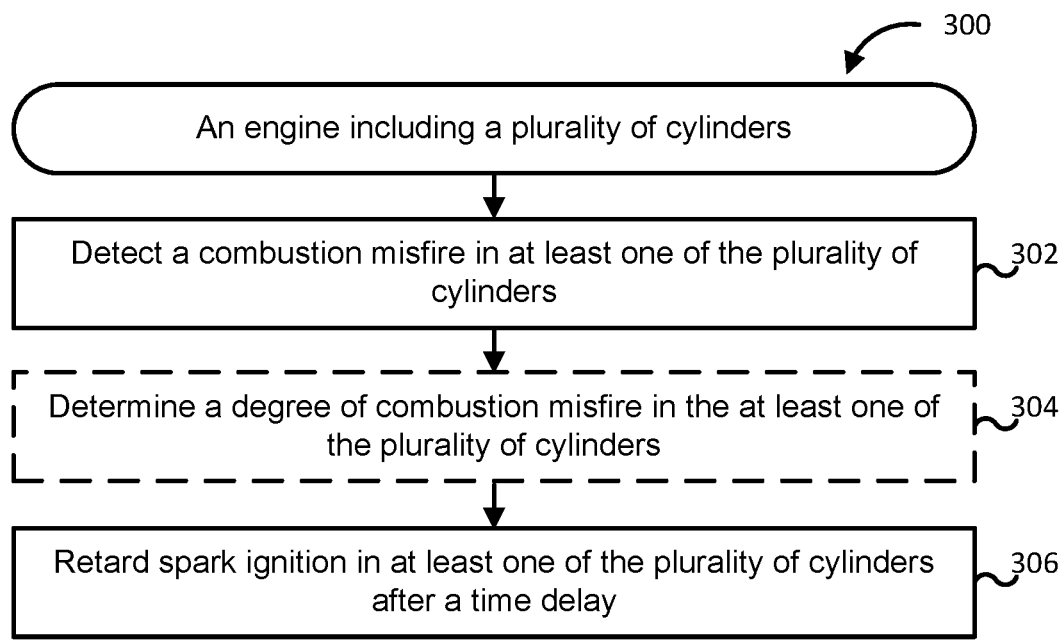
FIG. 3 is a schematic flow diagram of a method for reducing the impact of combustion misfire, occurring in a cylinder of a plurality of cylinders of an engine, on the operation of the engine, according to an embodiment.

FIG. 3 is a schematic flow diagram of a method 300 for combustion misfire control in an engine (e.g., an engine including the cylinder block 108) comprising a plurality of cylinders (e.g., the cylinders 130, 132, 134, 136, 138 and 140). At least a portion of the plurality of cylinders is configured to receive recirculated exhaust gas. In some embodiments, at least one of the cylinders of the plurality of cylinders (e.g., the dedicated EGR cylinders 134, and 136) may include a dedicated EGR cylinder. In other embodiment, the engine may be associated with a high or low pressure EGR system.

The method 300 includes detecting a combustion misfire in at least one of the cylinders of the plurality of cylinders, at 302. For example, the controller 170 may be configured to detect a combustion misfire in at least one of the plurality of cylinders 130, 132, 134, 136, 138, 140. In some embodiments, at least one of the plurality of cylinders (e.g., the cylinders 134 and 136) may include a dedicated EGR cylinder and the combustion misfire occurs in the dedicated EGR cylinder. The controller 170 may be configured to detect the combustion misfire based on at least one of an exhaust gas manifold pressure, an exhaust manifold temperature, a dedicated EGR cylinder pressure, an ionic current in the dedicated EGR cylinder, an amount of oxygen in recirculated exhaust gas, an amount of NOx in recirculated exhaust gas, an amount of vibration of the dedicated EGR cylinder or an engine torque of the engine, as previously described herein.

In some embodiments, the method 300 also includes determining a degree of combustion misfire in the at least one of the plurality of cylinders, at 304. For example, the controller 170 may be configured to determine a degree of combustion misfire, for example, in the dedicated EGR cylinders 134 and 136, as previously described herein.

A spark ignition timing is retarded in at least the portion of the plurality of cylinders after a time delay, at 306. For example, the controller 170, may be configured to retard a spark timing of the at least one of the plurality of cylinders 130, 132, 134, 136, 138, 140. In some embodiments, one of the plurality of the cylinders may include a dedicated EGR cylinder (e.g., the dedicated EGR cylinders 134 and 136) and the combustion misfire occurs in the dedicated EGR cylinder. In such embodiments, the spark timing of the dedicated EGR cylinder is retarded by a first amount immediately upon detecting the combustion misfire, for example, by the controller 170. Furthermore, the spark timing of the other cylinders (e.g., the non-EGR cylinders 130, 132, 138, 140) is retarded by a second amount after the time delay.

In some embodiments, the first amount of spark timing retard in the dedicated EGR cylinder and the second amount of spark timing retard in the other non-EGR cylinders of the plurality of cylinders is based on a degree of combustion misfire in the dedicated EGR cylinder. For example, the degree of combustion misfire may include a light misfire. In such embodiments, the second amount may be the same as the first amount. In other embodiments, the degree of combustion misfire may include moderate misfire. In such embodiments, the second amount may be different from the first amount, for example, the second amount of spark timing retard in the non-EGR cylinders (e.g., the cylinders 130, 132, 138, 140) may be greater than the first amount of spark timing retard in the dedicated EGR cylinder (e.g., the dedicated EGR cylinders 134 and 136).

Figure 4:
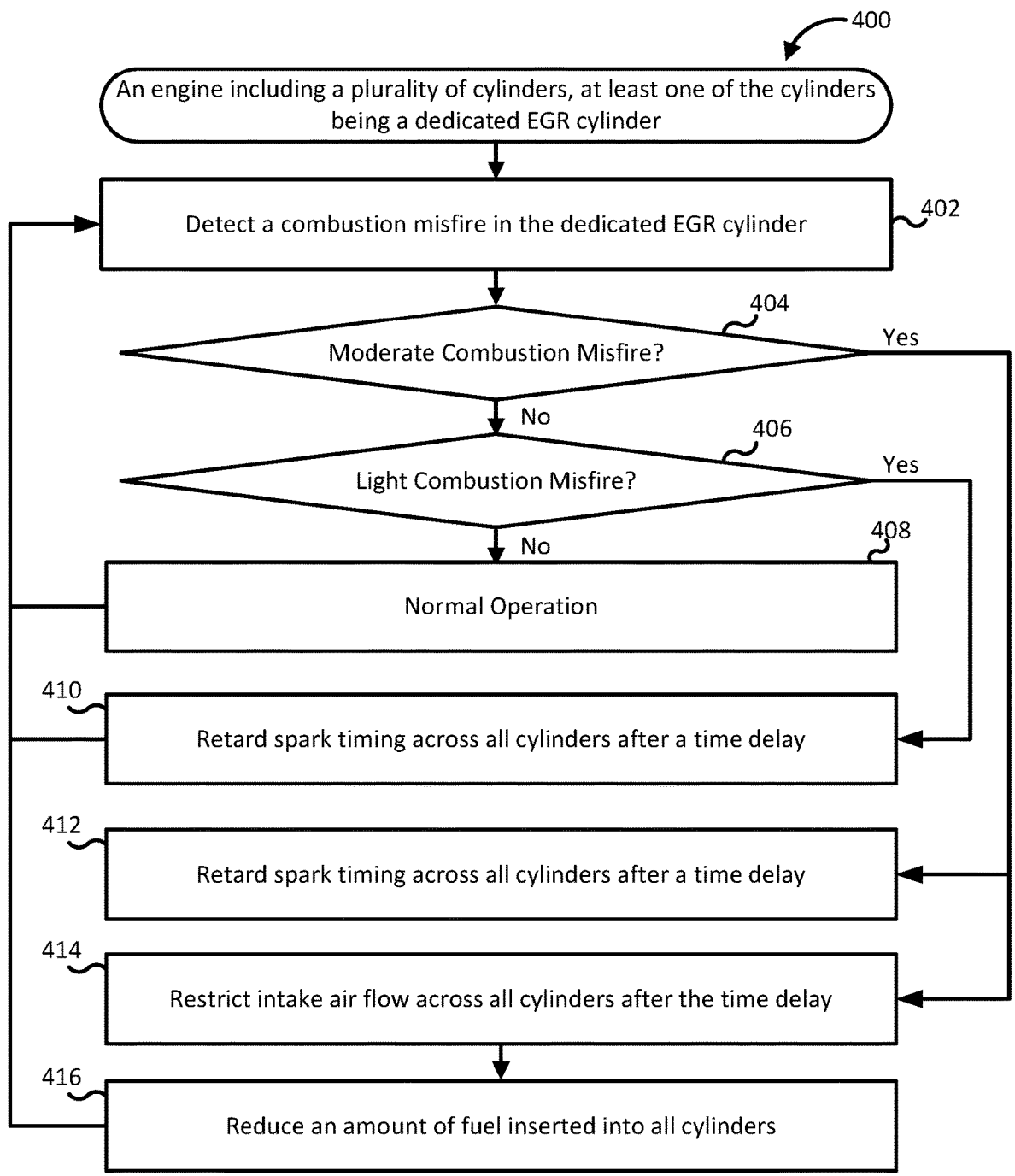
FIG. 4 is a schematic flow diagram of a method for reducing the impact of combustion misfire, occurring in a dedicated EGR cylinder of an engine, on the operation of the engine, according to an embodiment.

FIG. 4 is a schematic flow diagram of another method 400 for controlling combustion misfire in an engine (e.g., an engine including the cylinder block 108) that includes at least one dedicated EGR cylinder (e.g., the dedicated EGR cylinders 134 and 136). The method 400 includes detecting a combustion misfire in the dedicated EGR cylinder, at 402. For example, controller 170 may detect the combustion misfire in at least one of the dedicated EGR cylinders 134 or 136 based on an exhaust manifold pressure of the second exhaust manifold 114 or any other parameter as previously described herein.

At 404, it is determined if the combustion misfire is a moderate combustion misfire. For example, the controller 170 may determine a degree of the combustion misfire based on the exhaust manifold pressure or any other parameter, as described previously herein. In embodiments, in which the combustion misfire is determined based on the exhaust manifold pressure, the controller 170 may determine the degree of combustion misfire based on whether the exhaust manifold pressure is greater than the second pressure threshold corresponding to moderate combustion misfire, whether the exhaust manifold pressure is greater than the first pressure threshold corresponding to light misfire but less than the second pressure threshold, or less than the first pressure threshold corresponding to normal operation.

If it is determined that the combustion misfire does not correspond to moderate combustion misfire (404:NO), the method 400 proceeds to operation 406 and it is determined if the combustion misfire corresponds to light misfire. If at operation 406, it is determined that the combustion misfire is not light combustion misfire (406:NO), it is determined that engine is operating normally, at 408, and the method 400 returns to operation 402.

In response to determining the combustion misfire is moderate combustion misfire (404:YES), a spark timing of all the cylinders (e.g., the cylinders 130, 132, 134, 136, 138 and 140) is retarded after a time delay, at 412. For example, the controller 170 may retard the spark timing of each of the cylinders 130, 132, 134, 136, 138 and 140 after the time delay (e.g., a pre-determined fixed time delay, a variable time delay based on engine speed, or a variable time delay based on crank angle revolutions of a crankshaft of the engine). Furthermore, an intake air flow is restricted across all the cylinders after the time delay, at 414. Subsequently, an amount of fuel inserted into all the cylinders is reduced to maintain stoichiometric air/fuel ratio, at 416. For example, in response to detecting a moderate combustion misfire in at least one of the dedicated EGR cylinders 134 and 136, the controller 170 retards a spark timing of each of the plurality of cylinders 130, 132, 134, 136, 138 and 140 after the time delay. Furthermore, the controller 170 may command the equipment subsystems 104 (e.g., a spark ignition control system, a fuel injection system and an intake throttle control system) to restrict intake air flow after the time delay and subsequently reduce an amount of fuel inserted into each of the cylinders 130, 132, 134, 136, 138, 140.

If on the other hand, the combustion misfire is determined to be light combustion misfire (406:YES), the spark timing is also retarded across all the cylinders. For example, the controller 170 may command the equipment subsystems 104 to retard spark timing across all cylinders after the time delay. However, unlike for moderate combustion misfire, the controller 170 does not restrict the intake air flow or reduce the amount of fuel inserted into the plurality of cylinders 130, 132, 134, 136, 138, 140.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for controlling combustion misfire in an engine comprising a plurality of cylinders, at least a portion of the plurality of cylinders receiving recirculated exhaust gas, the system comprising:
   a controller structured to:
      detect a combustion misfire in at least one of the plurality of cylinders; and
      retard a spark timing of at least the portion of the plurality of cylinders after a time delay.

2. The system of claim 1, wherein the at least one of the plurality of cylinders comprises a dedicated exhaust gas recirculation (EGR) cylinder, the combustion misfire being in the dedicated EGR cylinder, and wherein the controller is configured to retard the spark timing of the dedicated EGR cylinder by a first amount immediately upon detecting the combustion misfire.

3. The system of claim 2, wherein the controller is further configured to:
   retard the spark timing of the other cylinders of the plurality of cylinders by a second amount after the time delay.

4. The system of claim 3, wherein the time delay is one of a pre-determined fixed time delay, a variable time delay based on engine speed, or a variable time delay based on crank angle revolutions of a crankshaft of the engine.

5. The system of claim 3, wherein the first amount of spark timing retard in the dedicated EGR cylinder and the second amount of spark timing retard in the other cylinders of the plurality of cylinders is based on an engine operating condition.

6. The system of claim 3, wherein the first amount of spark timing retard in the dedicated EGR cylinder and the second amount of spark timing retard in the other cylinders of the plurality of cylinders is based on a degree of combustion misfire in the dedicated EGR cylinder.

7. The system of claim 6, wherein the degree of combustion misfire comprises a light combustion misfire, and wherein the second amount is the same as the first amount.

8. The system of claim 6, wherein the degree of combustion misfire comprises moderate combustion misfire, and wherein second amount is different from the first amount.

9. The system of claim 2, wherein the controller is configured to detect the combustion misfire in the dedicated EGR cylinder based on at least one of an exhaust manifold pressure, an exhaust manifold temperature, a dedicated EGR cylinder pressure, an ionic current in the dedicated EGR cylinder, an amount of oxygen in recirculated exhaust gas, an amount of NOx in recirculated exhaust gas, an amount of vibration of the dedicated EGR cylinder, or an engine torque of the engine.

10. A system for controlling combustion misfire in an engine comprising a plurality of cylinders, at least one of the plurality of cylinders being a dedicated exhaust gas recirculation (EGR) cylinder, the system comprising:
   a controller structured to:
      detect a combustion misfire in the dedicated EGR cylinder;
      determine a degree of combustion misfire in the dedicated EGR cylinder; and
      after a time delay, retard a spark timing of each of the plurality of cylinders by an amount based on the degree of combustion misfire.

11. The system of claim 10, wherein the degree of combustion misfire comprises a light combustion misfire, and wherein the spark timing of each of the plurality of cylinders is retarded by the same amount.

12. The system of claim 10, wherein the degree of combustion misfire comprises a moderate combustion misfire, and wherein the controller is further configured to:
   after the time delay, restrict an intake air flow into each of the plurality of cylinders; and
   subsequently, reduce an amount of fuel inserted into each of the plurality of cylinders to maintain a stoichiometric air-fuel ratio in each of the plurality of cylinders.

13. The system of claim 10, wherein the spark timing of the dedicated EGR cylinder is retarded by a first amount and the spark timing of the other cylinders of the plurality of cylinders is retarded by a second amount, the second amount being different from the first amount.

14. The system of claim 10, wherein the controller is configured to detect the combustion misfire in the dedicated EGR cylinder based on at least one of an exhaust manifold pressure, an exhaust manifold temperature, a dedicated EGR cylinder pressure, an ionic current in the dedicated EGR cylinder, an amount of oxygen in recirculated exhaust gas, an amount of NOx in recirculated exhaust gas, an amount of vibration of the dedicated EGR cylinder, or an engine torque of the engine.

15. A method for combustion misfire control in an engine comprising a plurality of cylinders, at least a portion of the plurality of cylinders receiving recirculated exhaust gas, the method comprising:
   detecting a combustion misfire in at least one of the cylinders of the plurality of cylinders; and
   retarding a spark timing of at least the portion of the plurality of cylinders after a time delay.

16. The method of claim 15, wherein the at least one of the plurality of cylinders comprises a dedicated exhaust gas recirculation (EGR) cylinder, the combustion misfire being in the dedicated EGR cylinder, and wherein the spark timing of the dedicated EGR cylinder is retarded by a first amount immediately upon detecting the combustion misfire.

17. The method of claim 16, further comprising retarding the spark timing of the other cylinders of the plurality of cylinders by a second amount after the time delay.

18. The method of claim 17, wherein the time delay is one of a pre-determined fixed time delay, a variable time delay based on engine speed, or a variable time delay based on crank angle revolutions of a crankshaft of the engine.

19. The method of claim 17, further comprising determining a degree of combustion misfire in the dedicated EGR cylinder,
   wherein the first amount of spark timing retard in the dedicated EGR cylinder and the second amount of spark timing retard in the other cylinders of the plurality of cylinders is based on a degree of combustion misfire in the dedicated EGR cylinder.

20. The method of claim 19, wherein the degree of combustion misfire comprises a light combustion misfire, and wherein the second amount is the same as the first amount.

21. The method of claim 19, wherein the degree of combustion misfire comprises moderate combustion misfire, and wherein the second amount is different from the first amount.

22. A system for controlling combustion misfire in an engine comprising a plurality of cylinders, at least one of the plurality of cylinders being a dedicated exhaust gas recirculation (EGR) cylinder, the system comprising:
  a controller structured to:
    detect a combustion misfire in the dedicated EGR cylinder;
    implement spark retardation in the dedicated EGR cylinder immediately upon detecting the combustion misfire; and
    after a time delay, retard a spark timing of one or more of the plurality of cylinders by an amount based on the degree of combustion misfire.

\* \* \* \* \*